United States Patent Office 3,594,397
Patented July 20, 1971

3,594,397
HALOGENATED SILICON-CONTAINING CYCLIC ACETALS
François Meiller, Palaiseau, France, assignor to Société Industrielle des Silicones, Paris, France
No Drawing. Filed Oct. 16, 1969, Ser. No. 867,067
Claims priority, application France, Oct. 18, 1968, 170,480
Int. Cl. C07d *103/02*
U.S. Cl. 260—448.2B    23 Claims

ABSTRACT OF THE DISCLOSURE

Halogenated silicon-containing cyclic acetals having the formula:

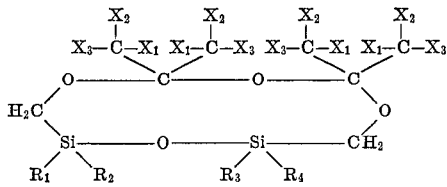

wherein $X_1$, $X_2$ and $X_3$ and bromine, chlorine or fluorine and $R_1$, $R_2$, $R_3$ and $R_4$ are the same or different groups, such as alkyl, aryl and substituted aryl, prepared by the reaction of a hexahaloacetone with a siloxanediol. The compounds are useful as anti-foaming agents, extraction solvents, and wetting agents.

---

This invention relates to halogenated silicon-containing cyclic acetals, and to a process for preparing them.

It is known that polyhalogenacetones can be reacted with alcohols or polyols to form hemiacetals. However, the hemiacetals formed are impossible to cyclise.

In addition, cyclised acetals not containing silicon are known to the art but several steps are required for their preparation. For example, it is frequently necessary to react a halogenated monoalcohol with an acetone to form a halogenated hemiacetal which can then be cyclised. Thus, bis(trifluoromethyl) 2,2-dioxolane is obtained by the cyclization by means of potassium hydroxide of the intermediate hemiacetal formed by the reaction of hexafluoroacetone and chloroethanol.

It is accordingly an object of the present invention to provide novel halogenated silicon-containing cyclic acetals, and to provide a one-step method for preparing them.

In accordance with the present invention, the halogenated silicon-containing cyclic acetals are compounds having a general formula:

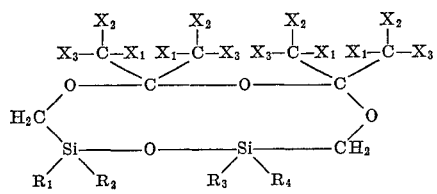

wherein $R_1$, $R_2$, $R_3$ and $R_4$ are the same or different groups and are alkyl having 1 to 8 carbon atoms, such as methyl, ethyl, propyl, isopropyl, etc; aryl having 6 to 14 carbon atoms, such as phenyl, naphthyl, etc; and substituted aryl having 6 to 14 carbon atoms, such as halo-substituted phenyl, etc; and $X_1$, $X_2$ and $X_3$ are the same or different atoms and can be halogen, such as bromine, but are preferably chlorine or fluorine.

The halogenated silicon-containing cyclic acetals are either liquids or solids due to the presence of the halogen in the molecule the solid or liquid phases depending upon the relative proportion of the fluorine and chlorine atoms in the molecule.

The novel compounds of the present invention may be prepared by reacting a hexahaloacetone with a siloxanediol at a temperature within the range of −30° C. and the boiling temperature of the reaction mixture, and preferably between 40 and 80° C.

The siloxanediol reactants used in accordance with the present invention can be represented by the formula:

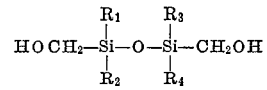

wherein $R_1$, $R_2$, $R_3$ and $R_4$ are the groups as set forth above.

Halogenated acetones used in the process of the present invention are represented by compounds having the formula:

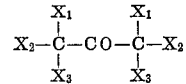

wherein $X_1$, $X_2$ and $X_3$ have the meaning as set forth herein above. Particularly preferred halogenated acetones include hexachloroacetone, hexafluoroacetone, pentafluorochloroacetone, symmetric dichlorotetrafluoroacetone and 1,1,3-trichlorotrifluoroacetone.

The proportions in which the siloxanediol is reacted with the hexahalogenacetone is not critical, although it is preferred for reasons of efficiency to react them in a molar ratio of 1:2. It has been found that an excess amount of the hexahalogenacetone ranging up to 0.5 times the theoretical quantity may be used.

The hexahalogenacetones may be reacted in their anhydrous state, or in their hydrated state, when the particular hexahalogenacetone used forms a hydrate. As a general rule, the hydrate has a higher boiling point than the anhydrous form, and hence the use of the hydrated form may be advantageous in that it permits the reaction to be carried out at higher temperatures, and makes it possible to avoid using a gaseous reactant. For example, hexafluoroacetone has a boiling point of −26° C. whereas the trihydrate has a boiling point of 105° C. Pentafluorochloroacetone has a boiling point of 7.8° C. in its anhydrous form and 105° C. in its hydrated form, and symmetrical dichlorotetrafluoroacetone has a boiling point of 45° C. in its anhydrous form compared to a boiling point of 106° C. in its hydrated form. As will be appreciated by one skilled in the art, when a gaseous hexahalogenacetone is employed, a stream of the gas may be passed through a liquid siloxanediol whereby the hexahalogenacetone immediately reacts with the siloxanediol. When a liquid hexahalogenacetone is employed, both liquids may be admixed.

As will also be appreciated, a mixture of two or more hexahalogenacetones may be used, resulting in the formation of a mixture of the corresponding acetals. Each acetal can be separated from the reaction mixture by conventional means, such as distillation, fractionation, crystallization, etc.

While is it not essential, a catalyst may be added to the reaction mixture in order to decrease the reaction time and increase the rate of reaction. Catalysts which may be used include those generally used for reactions in which acetals are formed, such as paratoluene sulfonic acid, sulfuric acid and chlorhydric acid. In addition to the foregoing catalysts, use can also be made of various acidic activated clays, and preferably those having a pH of about 4. The clay catalysts may be advantageously used in quantities of from 2–20%, and preferably 5–10% by weight of the siloxanediol reactant.

When a hexahalogenacetone in the anhydrous state is employed as the reactant, the water formed during the reaction reacts during the course of the reaction to form a hexahalogenacetone hydrate which can be collected in a conventional manner. Of course, it will be appreciated that the hydrate is formed only in those instances where the hexahalogenacetone is capable of existing in the hydrated state.

However, when the reactant is an anhydrous hexahalogenacetone which is not capable of forming a hydrate, or a hydrated hexahalogenacetone, the water formed during the reaction can be eliminated after the reaction has been completed by conventional operations such as decantation, distillation, evaporation under vacuum, or absorption by a hydrophilic material, or preferably by azeotropic distillation. In the latter operation, the solvent which is used to form the azeotrope must form an azeotrope having a relatively low boiling temperature, preferably in the range of 40–150° C. at atmospheric pressure. Preferred solvents for azeotropic distillation include relatively low boiling hydrocarbon solvents such as pentane, hexane, benzene, toluene and xylene. It is generally advisable to employ the solvent in an amount ranging from 1 to 5 times the weight of the siloxanediol reactant present in the reaction mixture.

When the resulting halogenated silicon-containing cyclic acetal is a solid, in may be advantageously prepared in a solution containing a solvent which is a solvent for both the starting material and the acetal formed. However, it is found to be even more advantageous to employ an organic solvent which is a solvent only for the starting materials and is not a solvent for the acetal product, whereby the acetal product precipitates out of the solution.

The time required for the reaction is not critical, and often depends upon the nature of reactants, the temperature of reaction, the nature of the catalyst, if any, as well as the quantity of the catalyst. Reaction times of up to 15 hours and preferably 1 to 5 hours, are generally sufficient to provide quantitative yields.

If a catalyst is employed, the catalyst may be eliminated after the reaction has occurred by conventional means such as neutralization, distillation under a vacuum if the catalyst is volatile, or by filtration if the catalyst is a solid.

When a solvent is used, it may be eliminated by distillation if the acetal is soluble in the solvent or by filtration if the acetal is insoluble in the solvent.

The novel compounds of the present invention have been found to be useful as intermediate products in organic synthesis, as anti-foaming agents, particularly in very acid or very basic media, as extraction solvents in acid or basic media and as wetting agents for mercization.

In order to illustrate the concepts of the present invention, reference is now made to the following examples, which are provided by way of illustration and not by way of limitation.

Example I

The apparatus for carrying out the reaction comprises a flask having three tubes, fitted with a stirrer and a cooler connected to the flask through an azeotropic decantation device. The following materials were added to the flask.

440 g. of trihydrated hexafluoroacetone
194 g. of bis(hydroxymethyl)tetramethyldisiloxane
300 cc. of benzene
15 g. of activated clay (Clarsil $PC_1$)

The reaction mixture was heated and slowly brought to its boiling point while the water formed during the reaction was removed azeotropically by the benzene. After the reaction proceeded for 4 hours, 125 cc. of water had been collected.

The reaction mixture was then filtered to remove the clay and the benzene distilled off. The remaining liquid was distilled at 137–140° C. under atmospheric pressure. The remaining 480 g. was found to be a transparent liquid representing a yield of 94% by weight. The centesimal analysis produced the following results.

Calculated (percent): C, 28.34; H, 3.14; F, 44.88.
Found (percent): C, 28.30; H, 3.10; F, 45.10.

Centesimal analysis as well as nuclear magnetic resonance spectra confirmed that the product had the formula:

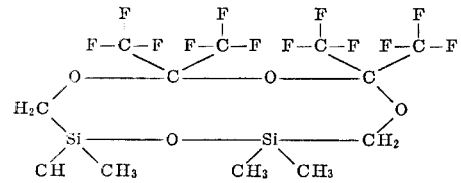

The product was found to have a boiling point of 137–140° C. and 29° C./9 mm. Hg. It has a decongelation point of about 0° C., a refractive index $n_D^{20}$ of 1.3441, and was found to be inert to gamma rays.

EXAMPLE II

Into an apparatus comprising a flask provided with a cooler maintained at −70° C., there was introduced 194 g. of bis(hydroxymethyl) tetramethyldisiloxane.

A stream of anyhdrous hexafluoroacetone was passed through the flask by means of a tube therein at a rate of 45 liters per hour. The temperature of the reaction mixture gradually increased and was thereafter maintained at 45–50° C. After hexafluoroacetone was passed through the flask for 1 hour, representing an introduction of about 2.5 moles of hexafluoroacetone, no further absorption of the hexafluoroacetone took place, and the hexafluoroacetone stream was stopped. Then the reaction mixture was heated to a temperature of 60–70° C. without the use of the cooler for 1 hour in order to degasify the hexafluoroacetone.

The reaction medium was homogeneous and the resulting product was distilled off.

The same product was obtained as in Example I with a yield of 97% relating to the theory. Infra-red spectrography and magnetic nuclear resonance confirmed the formula.

EXAMPLE III

In a flask provided with a cooler there was mixed at room temperature:

|  | G. |
|---|---|
| Hexachloroacetone | 530 |
| Bis(hydroxymethyl) tetramethyldisiloxane | 194 |

The reaction medium was slowly heated to 70° C. whereupon the reaction mixture became muddy and gradually thickened until it became solidified. The mixture was maintained at this temperature for 4 hours, after which hexane was added to dissolve the solid. The hexane solution was cooled and a yellowish-white precipitate was obtained. The precipitate was recrystallized with hexane, and, after the hexane was removed by heating the solid to 50° C., 635 g. of a white solid was obtained corresponding to a yield of 90% of theoretical.

This solid had a melting point of 157° C. and its centesimal analysis was what follows:

Calculated (percent): C, 20.40; H, 2.26; Cl, 60.33.
Found (percent): C, 20.47; H, 2.40; Cl, 60.15.

This centesimal analysis as well as magnetic nuclear resonance and infra-red spectrography confirmed that the obtained product had the formula:

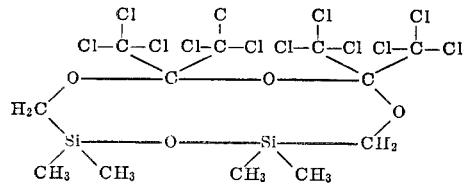

EXAMPLE IV

The following were introduced into the same apparatus as used in Example I.

265 g. of hexachloroacetone
97 g. of bis(hydroxymethyl) tetramethyldisiloxane
350 cc. of benzene
10 g. of activated clay (Clarsil $PC_1$)

The reaction medium was slowly heated to a boiling point and the benzene azeotropically absorbs water from the reaction during its formation. After reacting 5 hours, 8 cc. of water was collected.

The warm reaction mixture was filtered off in order to be free from clay. After cooling the solution, a partial precipitation of the reaction product was observed. The precipitate was filtered, the benzene was evaporated, a solid product remained. Precipitate and solid product were collected and were recrystallized with hexane. 335 g. were obtained, i.e., a yield of 95% relating to the theory of the same product as in Example III.

EXAMPLE V

In the apparatus used in Example III, 194 g. of bis(hydroxymethyl) tetramethyldisiloxane were introduced to the flask. A stream of gaseous anhydrous pentafluorochloroacetone was passed through the disiloxane, and the temperature of the reaction mixture gradually increased to 50 or 60° C., which temperature was then maintained for the remainder of the reaction.

After the pentafluorochloroacetone had been passed through the flask for a period of 2 hours, representing an introduction of about 2.5 moles of pentafluorochloroacetone, no further absorption of the gas was bserved.

The pentafluorochloroacetone stream was stopped and then the reaction mixture was heated to a temperature of 70° C. without the use of the cooler for one hour in order to remove excess pentafluorochloroacetone.

The formed product was distilled and 503 g. of transparent, colorless liquid was obtained, corresponding to a yield of theory. The centesimal analysis was as follows:

Calculated (percent): C, 26.61; H, 2.95; F, 35.12; Cl, 13.12. Found (percent): C, 26.49; H, 3.01; F, 35.15; Cl, 13.4.

This centesimal analysis, the magnetic nuclear resonance and the infra-red spectrography confirmed that the obtained product had the formula:

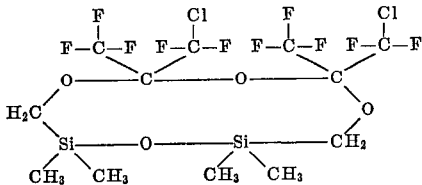

It had a boiling point of 62° C./12 mm. Hg and a refractive index $n_D^{22}=1.3765$.

EXAMPLE VI

The procedure of Example V was repeated using a mixture containing 90% by weight of pentafluorochloroacetone and 10% by weight of hexafluoroacetone instead of pentafluorochloroacetone.

A homogeneous liquid was obtained which was rapidly distilled off between 30 and 70° C./10 mm. Hg.

The slow distillation of this homogeneous liquid resulted in the separate products produced in Examples V and I in proportions corresponding to those of the starting mixture constituents.

EXAMPLE VII

In the apparatus utilized in Example I, trihydrated hexafluoroacetone was reacted with bis(hydroxymethyl) tetraphenyldisiloxane to form a solid product. Nuclear magnetic resonance spectra confirmed that the formula was:

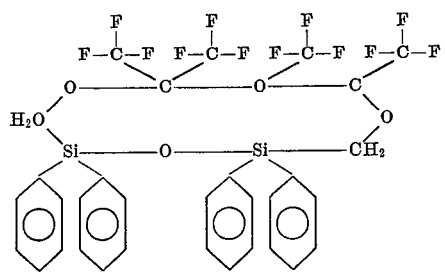

EXAMPLE VIII

This example illustrates the applications of the compounds of the present invention as anti-foaming agents in a strongly acid media.

In a 250 cc. flask there was introduced 100 cc. of a solution containing 0.5 g. of foaming agent (obtained by the condensation of ethylene oxide with stearyl alcohol) in one liter of water acidified with 50% by weight concentrated sulfuric acid, and the resulting solution was vigorously stirred for 10 seconds.

To this stirred solution, which was covered with abundant foam, 0.04% by weight of the product obtained in Example I, was added. The foam completely disappeared in a period less than 5 seconds.

The solution was stirred a second time for 10 seconds and the period of time necessary to suppress the foam again formed was measured and found to be 5.5 seconds. Several successive stirrings of 10 seconds duration of the same solution were carried out and the time required for the foam to disappear was measured between successive stirrings in order to determine the effectiveness of the anti-foaming product. The following results were obtained.

| Foam disappearing time, sec.: | After agitation, eme |
|---|---|
| 6 | 3 |
| 8 | 4 |
| 8 | 5 |
| 8.5 | 6 |
| 13 | 7 |
| 18.5 | 8 |
| 23.5 | 9 |
| 29 | 10 |
| 36 | 11 |
| 40 | 12 |
| 45 | 13 |
| 45 | 14 |
| 51 | 15 |
| 58 | 16 |
| 60 | 17 |

Thus, 16 successive foam disappearings were obtained before the disappearing time reaches 1 minutes.

It will be noticed that in very highly acid media, the anti-foaming power of the product obtained in Example I was preserved because of the stability of this product in very highly acid media.

On the other hand, the foam formed by agitation of the solution completely disappeared after several hours when the compound of Example I was not added.

The same test as previously described, carried out with a methylsiloxane classical anti-foaming agent, enabled only 5 successive foam disappearings before the disappearing time reached 1 minute.

If the foregoing tests are carried out at 50° C., it is still possible to observe 6 successive foam disappearings. At 80° C., there is no foam disappearing.

With the methylsiloxane as the anti-foaming agent, there were no foam disappearings whatever when the temperature of the solution was 50° C. or 80° C.

EXAMPLE IX

Using 0.07% of the anti-foaming product, instead of 0.04% as in Example VIII, at room temperature 34 successive foam disappearings were obtained before the disappearing time reached 1 minute.

EXAMPLE X

The same tests as in Examples VIII and IX were carried out but with a different foaming agent which was dimethylbenezene dodecylammoniumchloride, diluted with water acidified with 30% of concentrated sulfuric acid, during a series of tests, and with 50% of concentrated sulfuric acid during another series of tests.

The obtained results were summarized in the following table.

| | Quantity of added product of Example I, percent by weight | Temperature, 0° C. | Number of successive foam disappearings before one minute | Number of disappearings with a methylsiloxane |
|---|---|---|---|---|
| 30% $SO_4H_2$ | 0.04 | 20–23 | 29 | 5 |
| | 0.04 | 50 | 25 | 0 |
| | 0.04 | 80 | 12 | 0 |
| | 0.07 | 20–23 | 55 | |
| 50% $SO_4H_2$ | 0.04 | 20–23 | 10 | 3 |
| | 0.04 | 50 | 4 | 0 |
| | 0.04 | 80 | 4 | 0 |
| | 0.07 | 20–23 | 15 | |

It will be apparent from the foregoing that I have provided novel halogenated silicon-containing acetals which can be produced in a greatly simplified one-step process. The compounds of the present invention have been found to possess superior anti-foaming properties as compared to silicon-containing compounds heretofore used for this purpose.

It will be understood that various changes can be made in the details of formulation of use without departing from the spirit of the invention, especially as defined in the following claims.

What is claimed is:

1. Halogenated silicon-containing cyclic acetal compounds of the formula:

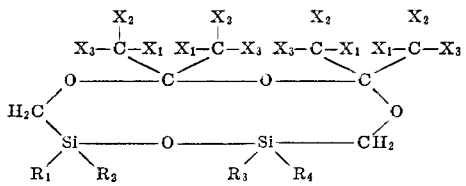

wherein $X_1$, $X_2$ and $X_3$ are selected from the group consisting of bromine, chlorine or fluorine and $R_1$, $R_2$, $R_3$ and $R_4$ are the same or different groups selected from the group consisting of alkyl having 1 to 8 carbon atoms, aryl having 6 to 14 carbon atoms and substituted aryl having 6 to 14 carbon atoms.

2. A compound as defined in claim 1 wherein $R_1$, $R_2$, $R_3$ and $R_4$ are each selected from the group consisting of methyl, ethyl, propyl, isopropyl and phenyl.

3. A compound as defined in claim 1 wherein $X_1$, $X_2$ and $X_3$ are fluorine.

4. A compound as defined in claim 1 wherein $X_1$, $X_2$, $X_3$ are chlorine.

5. A compound as defined in claim 3 wherein $R_1$, $R_2$, $R_3$ and $R_4$ are methyl.

6. A compound as defined in claim 4 wherein $R_1$, $R_2$, $R_3$ and $R_4$ are methyl.

7. A compound as defined in claim 1 having the formula:

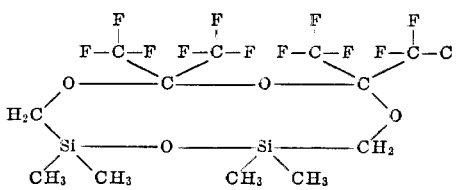

8. A process for the preparation of halogenated silicon-containing acetals comprising reacting at least one hexahaloacetone with a bis-hydroxymethyl disiloxane.

9. A process as defined in claim 8 wherein the reaction is carried out at a temperature in the range of −30° C. and the boiling temperature of the reaction mixture.

10. A process as defined in claim 8 wherein the reaction is carried out at a temperature within the range of 40° to 80° C.

11. A process as defined in claim 8 wherein said hexahaloacetone is selected from the group consisting of hexachloroacetone, hexafluoroacetone, pentafluorochloroacetone, sym-dichlorotetrafluoroacetone and 1,1,3-trichlorotrifluoroacetone.

12. A process as defined in claim 8 wherein said bishydroxymethyl disiloxane is reacted with said hexahaloacetone in a molar ratio of about 1:2.

13. A process as defined in claim 8 wherein said hexahaloacetone is present in the reaction mixture in excess of up to 0.5 times the theoretical amount.

14. A process as defined in claim 8 wherein said hexahaloacetone is in a substantially anhydrous state.

15. A process as defined in claim 8 wherein said hexahaloacetone is in a hydrated state.

16. A process as defined in claim 8 wherein the reaction is carried out in the presence of a catalyst.

17. A process is defined in claim 16 wherein said catalyst is selected from the group consisting of para-toluenesulfonic acid, sulfuric acid, chlorhydric acid and acidic activated clays.

18. A process as defined in claim 15 wherein said catalyst is an acidic activated clay having a pH of about 4 and is present in an amount constituting between 2 to 20 percent by weight of the bis-hydroxymethyl disiloxane.

19. A process as defined in claim 8 wherein said hexahaloacetone is a mixture of hexahaloacetones.

20. A process as defined in claim 8 wherein said bishydroxymethyl disiloxane has the formula:

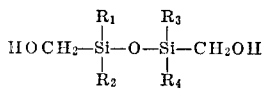

wherein $R_1$, $R_2$, $R_3$ and $R_4$ are the same or different groups selected from the group consisting of alkyl having 1 to 8 carbon atoms, aryl having 6 to 14 carbon atoms and substituted aryl having 6 to 14 carbon atoms.

21. A process as defined in claim 8 wherein said hexahaloacetone has the formula:

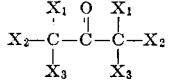

wherein $X_1$, $X_2$ and $X_3$ are selected from the group consisting of bromine, chlorine or fluorine.

22. A process as defined in claim 8 wherein the reaction time is from 1 to 15 hours.

23. A process as defined in claim 8 wherein the reaction time is from 1 to 5 hours.

References Cited

UNITED STATES PATENTS 3,437,679   4/1969   Simmler et al.   260—448.2B

TOBIAS E. LEVOW, Primary Examiner

P. F. SHAVER, Assistant Examiner

U.S. Cl. X.R.

252—351, 358; 260—448.2E

CERTIFICATE OF CORRECTION

Patent No. 3,594,397                                Dated July 20, 1971

Francois Meiller

It is certified that errors appear in the above identified patent and that said Letters Patent are hereby corrected as shown below:

Column 4, the structural formula starting with line 10 should read:

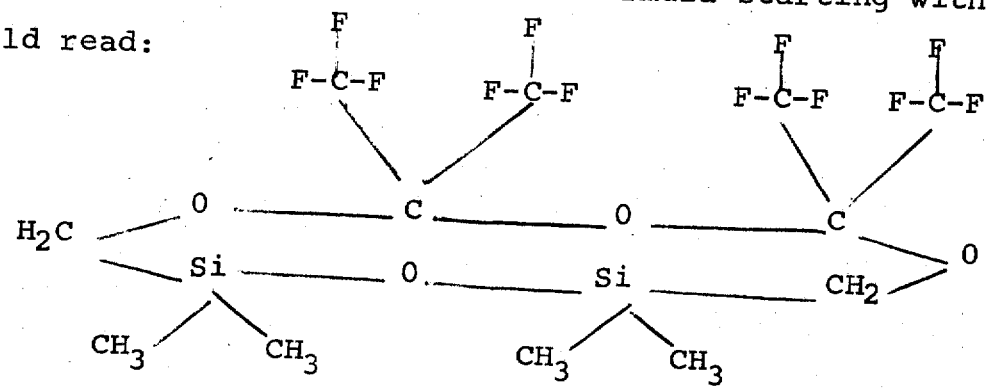

Column 4, line 66, change "spectrography" to "spectography"

Column 4, the structural formula at the bottom of the column should read:

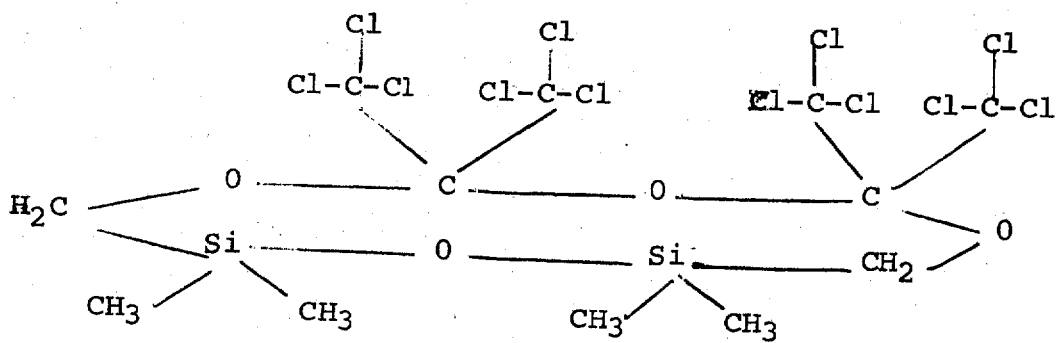

Signed and sealed this 14th day of March 1972.

(SEAL)
Attest:

EDWARD M.FLETCHER,JR.                    ROBERT GOTTSCHALK
Attesting Officer                        Commissioner of Patents